United States Patent [19]

Wilson et al.

[11] Patent Number: 5,587,755
[45] Date of Patent: Dec. 24, 1996

[54] VARIABLE FORMAT VIEWFINDER FOR CAMERA

[75] Inventors: Matthew Wilson, Rochester; Frank P. Lauricella, Brockport, both of N.Y.

[73] Assignee: Eastman Kodak Company, Rochester, N.Y.

[21] Appl. No.: 371,340

[22] Filed: Jan. 11, 1995

[51] Int. Cl.⁶ ................................................ G03B 13/10
[52] U.S. Cl. ................................ 396/380; 396/435
[58] Field of Search .......................... 354/94, 159, 219, 354/222

[56] References Cited

U.S. PATENT DOCUMENTS

| | | |
|---|---|---|
| 2,149,384 | 3/1938 | Becker . |
| 2,943,549 | 7/1960 | Nerwin ................................ 95/44 |
| 3,011,385 | 12/1961 | Frost . |
| 3,619,202 | 11/1971 | Bellows ................................ 95/44 |
| 4,529,283 | 7/1985 | Oshima et al. .................... 354/195.12 |
| 5,059,994 | 10/1991 | Harvey .............................. 354/222 |
| 5,066,971 | 11/1991 | Kodaira .............................. 354/465 |
| 5,111,228 | 5/1992 | Hansen .............................. 354/222 |
| 5,255,030 | 10/1993 | Mukai et al. ...................... 354/94 |
| 5,353,076 | 10/1994 | Goddard ............................ 354/94 |

OTHER PUBLICATIONS

16031 Research Disclosure Aug. 1977.
16981 Research Disclosure May 1978.

*Primary Examiner*—Michael L. Gellner
*Assistant Examiner*—Daniel Chapik
*Attorney, Agent, or Firm*—Roger A. Fields

[57] ABSTRACT

A variable format viewfinder for a camera comprises a pair of masking blades at least one of which is movable relative to the other to change the format of the view through the viewfinder to match the format of a picture to be taken. One of the masking blades has a plurality of format-indicators which are individually uncovered by the other blade each time at least one of the masking blades is moved to change the format of the view through the viewfinder. This permits the uncovered indicator to be seen to identify the format of the picture to be taken.

2 Claims, 4 Drawing Sheets

VARIABLE FORMAT VIEWFINDER FOR CAMERA

FIELD OF THE INVENTION

The invention relates generally to the field of photography, and in particular to a viewfinder in a camera for viewing and framing a subject to be photographed. More specifically, the invention relates to a viewfinder with a masking device for changing the format of the view through the viewfinder to match the format of a picture to be taken.

BACKGROUND OF THE INVENTION

When taking a picture, it is necessary to know not only in what direction to aim the camera but also how much of the subject will be included in the picture. For this reason practically every camera has a viewfinder of some kind.

There are known cameras that are intended to take pictures having various formats. For example, the pictures may be interspersed full-size exposures about 36.6 mm×24.4 mm (length×height) and reduced-height panoramic exposures about 36.6 mm×13.3 mm. The viewfinder for these cameras has a masking device for changing the format, i.e. the aspect ratio, of the view through the viewfinder in accordance with the format of the exposure to be made. The 36.6 mm×24.4 mm exposure has an aspect ratio of 1.5:1, and the 36.6 mm×13.3 mm exposure has an aspect ratio of 2.75:1.

SUMMARY OF THE INVENTION

According to one aspect of the invention, there is provided a variable format viewfinder for a camera comprising a pair of masking blades at least one of which is movable relative to the other to change the format of the view through the viewfinder to match the format of a picture to be taken, characterized in that:

one of the masking blades has a plurality of format-indicators which are individually uncovered by the other blade each time at least one of the masking blades is moved to change the format of the view through the viewfinder, to permit an uncovered indicator to be seen to identify the format of the picture to be taken.

According to another aspect of the invention, there is provided a variable format viewfinder comprising a light-blocking blade movable to peripherally occlude the view through the viewfinder to change the format of the view, is characterized in that:

the blade has a light-transmissive cut-out which is positioned to be seen when the blade is moved to change the view through the viewfinder, to indicate that the change has occurred.

DETAILED DESCRIPTION OF THE INVENTION

The invention is disclosed as being embodied preferably in a viewfinder for a camera. Because the features of a viewfinder are well known, the description which follows is directed in particular only to those elements forming part of or cooperating directly with the disclosed embodiment. It is to be understood, however, that other elements may take various forms known to a person of ordinary skill in the art.

Figure 1:
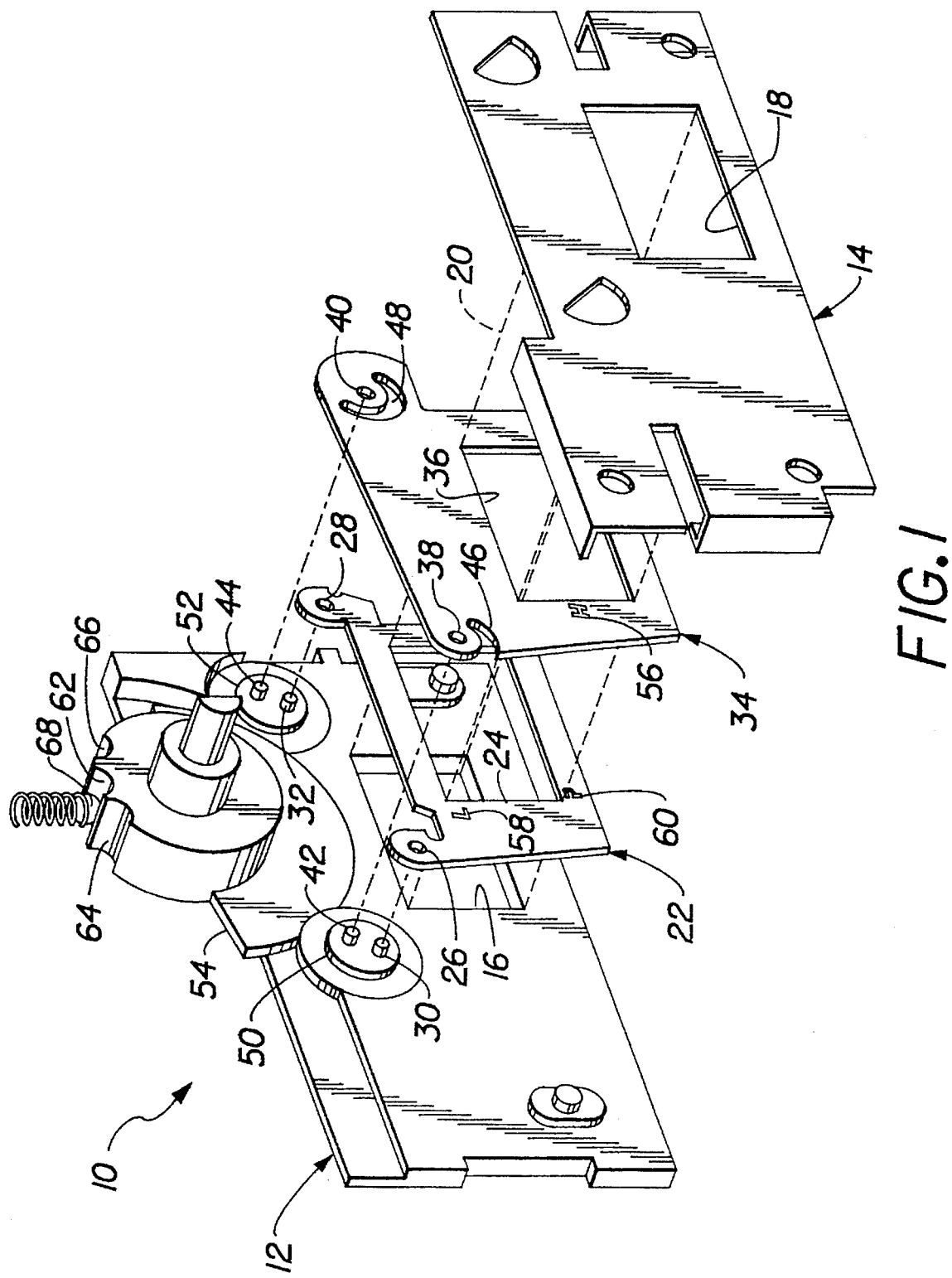
FIG. 1 is an exploded perspective view of a variable format viewfinder according to a preferred embodiment of the invention.

Referring now to the drawings, FIG. 1 shows a variable format viewfinder 10 including a pair of front and rear enclosure walls 12 and 14 having front and rear viewfinder openings or windows 16 and 18 which define a view 20 through the viewfinder. The rear viewfinder opening 18 is often referred to as an eye opening.

A front masking or light-blocking blade 22 with a rectangular-shaped opening 24 has a pair of holes 26 and 28 that loosely receive respective pins 30 and 32. A rear masking or light-blocking blade 34 with a rectangular-shaped opening 36 has a pair of holes 38 and 40 that loosely receive respective pins 42 and 44 and has a pair of clearance slots 46 and 48 that loosely receive the pins 30 and 32. The pins 30 and 42 project from a peripherally-toothed rotatable pinion 50, and the pins 32 and 44 project from a peripherally-toothed rotatable pinion 52. A peripherally-toothed selector gear 54 is rotatable in engagement with the two pinions 50 and 52 to rotate the pinions in similar directions to move the front and rear masking blades 22 and 34 relative to each other. See FIGS. 2-4.

Figure 2:
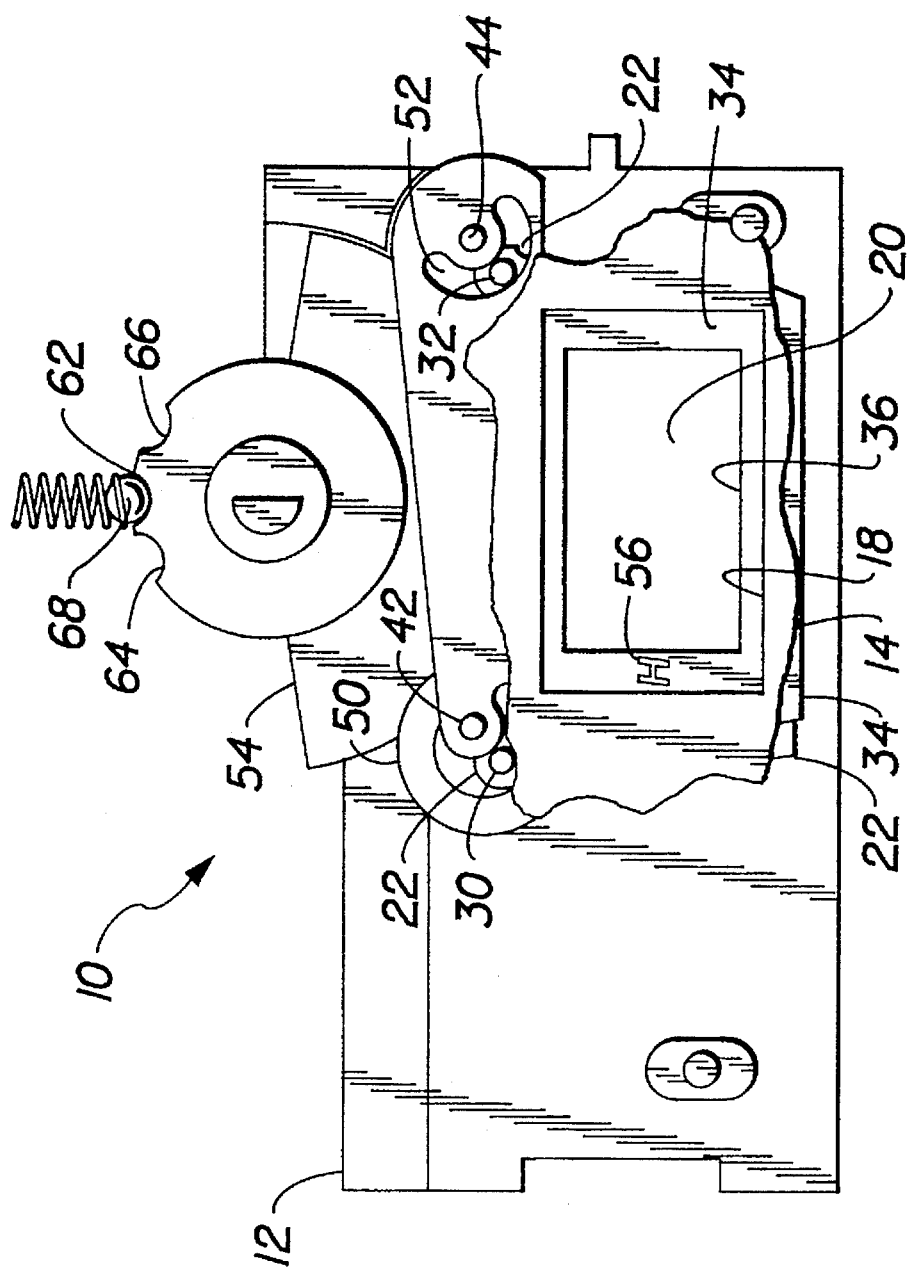
FIG. 2 is an elevation view of the variable format viewfinder with a pair of masking blades shown in a default HD format position.

FIG. 2 shows the front and rear masking blades 22 and 34 in a default HD format position. In HD format position, the masking blades 22 and 34 peripherally occlude the view 20 to define a viewing format that has an aspect ratio of 1.756:1 (length-to height), which is similar to the aspect ratio of high-density television. Also, a light-transmissive cut-out 56 in the form of the letter "H" on the rear masking blade 34 is visible inside the rear viewfinder opening 18 to indicate the front and rear masking blades are in the HD format position.

Figure 3:
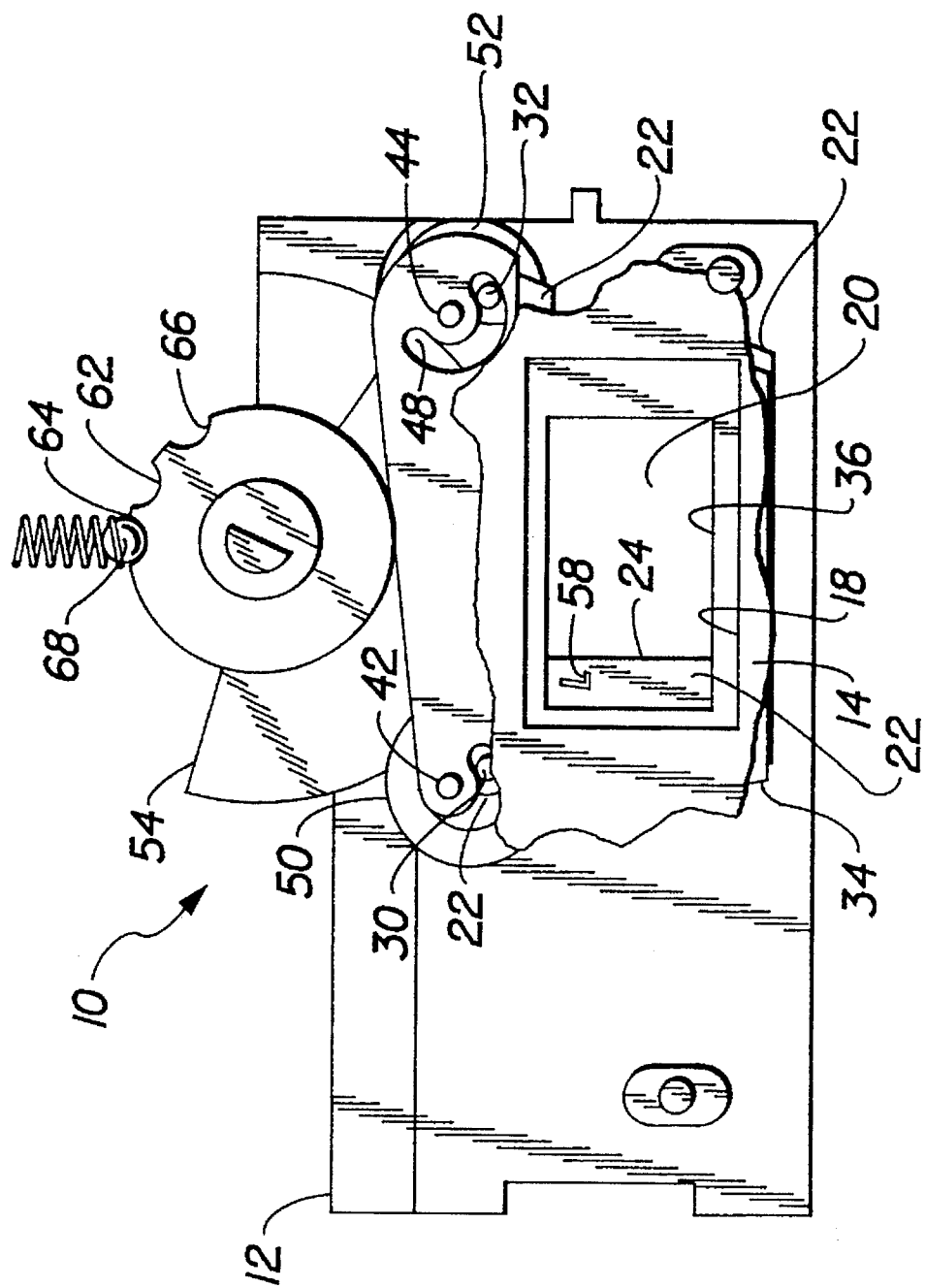
FIG. 3 is an elevation view of the variable format viewfinder with the masking blades shown in a 3R format position.

When the selector gear 54 is rotated 20 degrees clockwise in FIG. 2, the pinions 50 and 52 are rotated counter-clockwise to move the front and rear masking blades 22 and 34 from their default HD format position to a 3R format position shown in FIG. 3. In the 3R format position, the masking blades 22 and 34 peripherally occlude the view 20 to define a viewing format that has an aspect ratio of 1.429:1 (length-to height), which is similar to the aspect ratio of normal size prints. Also, a light-transmissive cut-out 58 in the form of the letter "L" on the front blade 22 is uncovered by the rear masking blade 34 to be made visible inside the rear viewfinder opening 18 to indicate the front and rear masking blades are in the 3R format position. The light-transmissive cut-out 56 in the form of the letter "H" on the rear masking blade 34 is covered by the rear enclosure wall 14.

Figure 4:
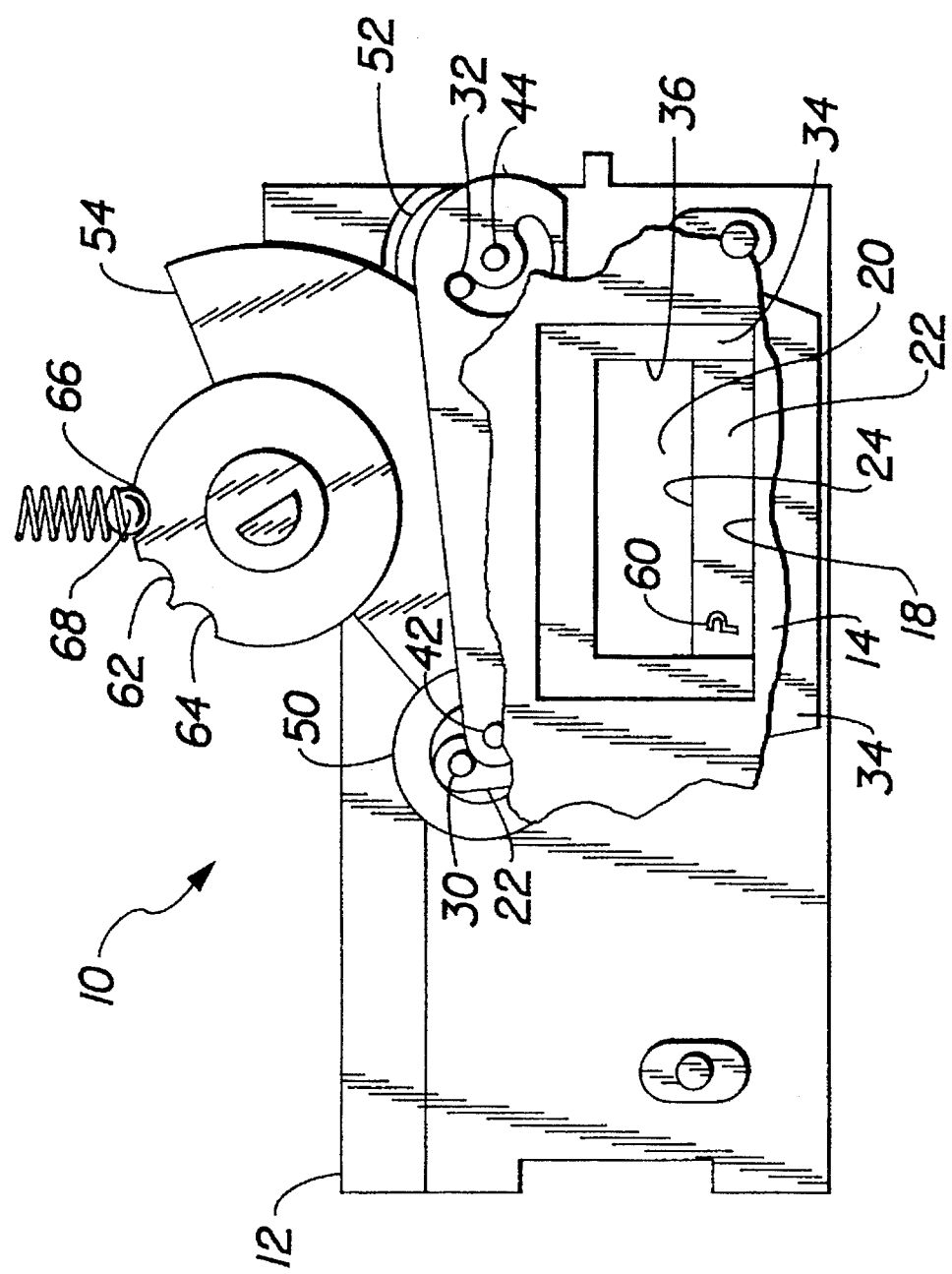
FIG. 4 is an elevation view of the variable format viewfinder with the masking blades shown in a pan format position.

When the selector gear 54 is rotated 27 degrees counter-clockwise in FIG. 2, the pinions 50 and 52 are rotated clockwise to move the front and rear masking blades 22 and 34 from their default HD format position to a pan format position shown in FIG. 4. In the pan format position, the masking blades 22 and 34 peripherally occlude the view 20 to define a viewing format that has an aspect ratio of 2.854:1 (length-to height), which is similar to the aspect ratio of panoramic size prints. Also, a light-transmissive cut-out 60 in the form of the letter "P" on the front blade 22 is uncovered by the rear masking blade 34 to be made visible inside the rear viewfinder opening 18 to indicate the front and rear masking blades are in the pan format position. The light-transmissive cut-out 56 in the form of the letter "H" on the rear masking blade 34 is obscured or occluded by the front masking blade 22, and the light-transmissive cut-out 58 in the form of the letter "L" on the front masking blade 22 is covered by the rear masking blade.

Thus, in the HD format position shown in FIG. 2, the rear masking blade 34 covers the light-transmissive cut-outs 58 and 60 in the form of the letters "L" and "P" on the front masking blade 22, and the light-transmissive cut-out 54 in the form of the letter "H" on the rear masking blade is uncovered by the rear enclosure wall 14. In the 3R format position shown in FIG. 3, the rear masking blade 34 covers the light-transmissive cut-out 60 in the form of the letter "P" on the front masking blade 22, the rear enclosure wall 14 covers the light-transmissive cut-out 54 in the form of the letter "H" on the rear masking blade, and the light-transmissive cut-out 58 in the form of the letter "L" on the front masking blade 22 is uncovered by the rear masking blade. In the pan format position shown in FIG. 4, the rear masking blade 34 covers the light-transmissive cut-out 58 in the form of the letter "L" on the front masking blade 22, the front masking blade 22 obscures or occludes the light-transmissive cut-out 54 in the form of the letter "H" on the rear masking blade, and the light-transmissive cut-out 60 in the form of the letter "P" on the front masking blade 22 is uncovered by the rear masking blade.

The selector gear 54 has three detents 62, 64, and 66 which are releasably engaged by a spring-urged ball 68 to releasably secure the selector gear to hold the front and rear masking blades 22 and 34 in the HD format position, the 3R format position, and the pan format position.

The invention has been described with reference to a preferred embodiment. However, it will be appreciated that variations and modifications can be effected by a person of ordinary skill in the art without departing from the scope of the invention. For example, the variable format viewfinder 10 can be modified to serve as a masking device in an exposure gate to alternatively expose the light-transmissive cut-outs 54, 58, and 60 in the form of letters "H", "L", and "P" on photosensitive film or paper.

PARTS LIST 10. variable format viewfinder
12. front enclosure wall
14. rear enclosure wall
16. front viewfinder opening
18. rear viewfinder opening
20. view through the viewfinder
22. front masking blade
24. rectangular-shaped opening
26. hole
28. hole
30. pin
32. pin
34. rear masking blade
36. rectangular-shaped opening
38. hole
40. hole
42. pin
44. pin
46. clearance slot
48. clearance slot
50. pinion
52. pinion
54. selector gear
56. "H" cut-out
58. "L" cut-out
60. "P" cut-out
62. detent
64. detent
66. detent
68. spring-urged ball

We claim:

1. A variable format viewfinder for a camera comprising masking blades movable to change the format of the view through said viewfinder to match the format of a picture to be taken, is characterized in that:

said masking blades have respective different aspect ratio indicators which are individually uncovered by one of the masking blades each time the one blade is moved to change the format of the view through said viewfinder, to permit an uncovered indicator to be seen to identify the particular aspect ratio of the picture to be taken.

2. A variable format viewfinder as recited in claim 1, wherein manual aspect ratio selector means is movable from an intermediate position in which said masking blades define a default aspect ratio of the view through said viewfinder in a first direction for moving at least one of the masking blades in a corresponding direction to change the aspect ratio of the view through the viewfinder from the default aspect ratio to another aspect ratio and is movable from the intermediate position in a second direction for moving at least one of the blades in a corresponding direction to change the aspect ratio of the view through the viewfinder from the default aspect ratio to another aspect ratio.

* * * * *